F. C. OLDHAM.
SPRING WHEEL.
APPLICATION FILED NOV. 8, 1907.
971,067.
Patented Sept. 27, 1910.
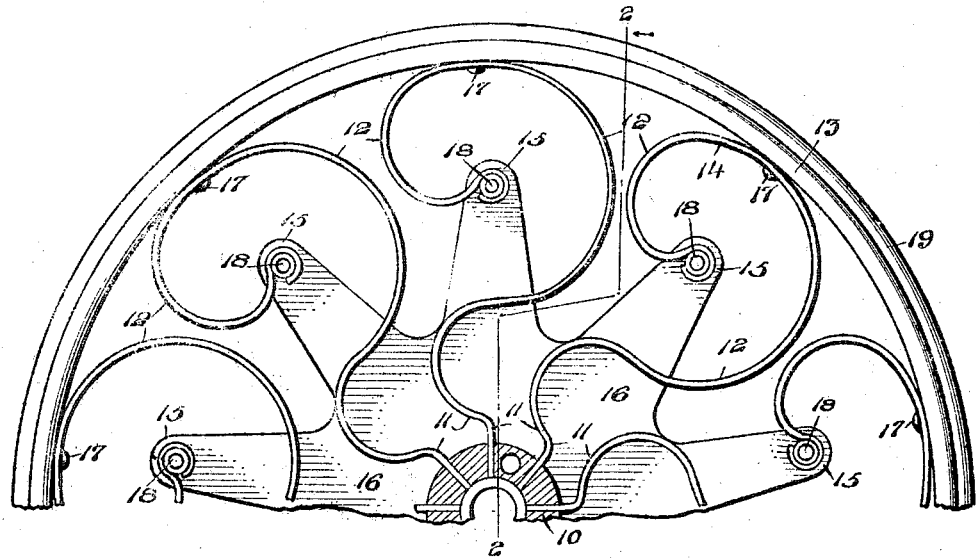
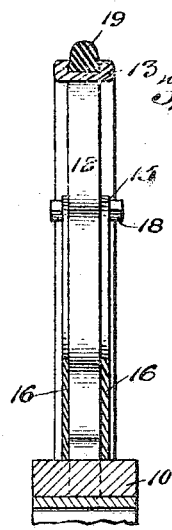
Witnesses
G. M. Spring.
J. J. Mawhinney
Inventor
Fred. C. Oldham,
By Mason Fenwick & Lawrence,
his Attorneys

UNITED STATES PATENT OFFICE.

FREDERICK C. OLDHAM, OF BROOKLYN, NEW YORK.

SPRING-WHEEL.

971,067.  Specification of Letters Patent.  Patented Sept. 27, 1910.

Application filed November 8, 1907. Serial No. 401,303.

*To all whom it may concern:*

Be it known that I, FREDERICK C. OLDHAM, a citizen of the United States, residing at Brooklyn, in the county of Kings and State of New York, have invented certain new and useful Improvements in Spring-Wheels; and I do hereby declare the following to be a full, clear, and exact description of the invention, such as will enable others skilled in the art to which it appertains to make and use the same.

This invention relates to wheels which are applied to any kind of vehicles and it more especially relates to that class of devices known as spring wheels whereby a system of springs in the wheels are caused to act as a cushion and to absorb a certain amount of shock which is imparted to the vehicle on account of irregularities in the road.

Certain objects of the invention are to so construct a wheel that the outermost ends of the springs carry the load as well as the ends of the springs, which are secured to the hub of the wheel, thus distributing the load and allowing a greater capacity for the absorption of the shocks which the wheels receive in traveling.

With these and other objects in view, the invention comprises certain novel constructions, combinations and arrangements of parts as will be hereinafter fully described and claimed.

In the accompanying drawings:—Figure 1 discloses a side elevation in cross section of a portion of the improved wheel. Fig. 2 is a sectional view of line 2—2 of Fig. 1.

In the drawings which illustrate an embodiment of the invention a hub 10 is shown as carrying the inner ends 11 of the springs 12 which support the rim 13 of the wheel upon the outer ends 14. The springs 12 are formed at their outer ends into a spiral the ends of which are secured to the outer points 15 of the plates 16 which are secured rigidly upon the hub 10. At the point where the spring 12 contacts with the rim 13 the spring is secured to said rim in any suitable manner as by a bolt 17. This is for the purpose of keeping the springs in their positions and not allowing the same to slide beyond their centers. The outer ends of the springs 12 may be secured to the extremities of the plates in any suitable manner but preferably by securing the same in position with a bolt 18 which passes through the curved end of the spring between the extremities of the plates. For the assurance of greater resiliency and for deadening the noise of the rotation of the wheels a tire 19 of any description may be secured upon the rim 13.

What I claim is:—

1. In a spring wheel, a rim, a hub, springs inserted in the hub and extending in curved lines toward and secured to the rim, and with extremities again curved toward the hub, plates upon opposite sides and pivotally connected to the extremities of the springs.

2. In a spring wheel, a rim, a hub, springs inserted within the hub and extending in curved lines toward and secured to the rim, and with the extremities again curved toward the hub, spider shaped plates upon opposite sides and with the extremities of the legs pivotally connected to the extremities of the springs.

3. In a spring wheel, a rim, a hub, substantially S-shaped springs secured at opposite curves to the hub and rim, and plates upon opposite sides of the springs pivotally secured to their outer extremities.

4. In a spring wheel, a rim, a hub, substantially S-shaped springs secured at opposite curves to the hub and rim, spider shaped plates upon opposite sides of the springs and with the extremities of the legs pivotally secured to the outer extremities of the springs.

5. In a spring wheel, a rim, a hub centrally disposed relative to the rim, a plate disposed upon one side of the hub, a spring having one end rigidly secured to the hub and extending outwardly in curved lines to the rim and secured to the rim at the curvature and with its end continued in the curved line and secured pivotally to the plate.

In testimony whereof I affix my signature in presence of two witnesses.

FREDERICK C. OLDHAM.

Witnesses:
   G. V. OLDHAM,
   HUGO MOCK.